US008358456B2

(12) United States Patent
Urakawa et al.

(10) Patent No.: US 8,358,456 B2
(45) Date of Patent: Jan. 22, 2013

(54) SCANNING IMAGE PROJECTION APPARATUS (75) Inventors: Takashi Urakawa, Kawasaki (JP);
Keiichiro Ishihara, Yokohama (JP)

(73) Assignee: Canon Kabushiki Kaisha (JP)

( * ) Notice: Subject to any disclaimer, the term of this patent is extended or adjusted under 35 U.S.C. 154(b) by 167 days.

(21) Appl. No.: 13/044,057

(22) Filed: Mar. 9, 2011

(65) Prior Publication Data
US 2011/0228369 A1 Sep. 22, 2011

(30) Foreign Application Priority Data

Mar. 16, 2010 (JP) .................................. 2010-059177

(51) Int. Cl.
*G02B 26/08* (2006.01)

(52) U.S. Cl. ................................................... 359/202.1

(58) Field of Classification Search ............... 359/202.1, 359/204.1, 629; 353/99
See application file for complete search history.

(56) References Cited

U.S. PATENT DOCUMENTS

| 7,967,452 | B2 * | 6/2011 | Itoh et al. | 359/239 |
| 2009/0147224 | A1 | 6/2009 | Kurozuka et al. | |
| 2009/0262262 | A1 | 10/2009 | Itoh et al. | |

FOREIGN PATENT DOCUMENTS

| JP | 2005-010616 A | 1/2005 |
| JP | 2005-114985 A | 4/2005 |
| JP | 2009098544 A | 5/2009 |
| WO | 2008155771 A2 | 12/2008 |

OTHER PUBLICATIONS

Extended European Search Report (EESR) issued Feb. 22, 2012 for corres. EP11002054.2.

* cited by examiner

*Primary Examiner* — Euncha Cherry
(74) *Attorney, Agent, or Firm* — Rossi, Kimms & McDowell LLP

(57) ABSTRACT

The image projection apparatus includes a laser light source, and a scanning device scanning a light flux from the laser light source in horizontal and vertical directions at mutually different frequencies on a projection surface. A condition of $$\frac{(B+C)X}{2000} \le A \le \frac{7L}{|L-X|}$$

is satisfied. A represents a diameter of an exit pupil when viewed from a projection surface side, L represents a distance from the exit pupil to an image formation position of the light flux, X represents a distance from the exit pupil to an output measurement position, B and C respectively represent vertical and horizontally scanning angular subtenses of a scan pulse formed by the light flux, the scan pulse having a pulse length equal to or shorter than 18 microseconds and passing through a measurement aperture placed at the output measurement position.

2 Claims, 5 Drawing Sheets

SCANNING IMAGE PROJECTION APPARATUS

BACKGROUND OF THE INVENTION

1. Field of the Invention

The present invention relates to a scanning image projection apparatus that scans laser light to project images.

2. Description of the Related Art

For scanning image projection apparatuses using a laser light source, the international standard IEC60825 and respective countries place limits on output powers of these light sources (laser light source). Specifically, IEC60825 desires that the output power of the light source be set to or below Class 2 at which safety is secured by blinks due to aversive reaction of a viewer if a light flux from the light source directly enters a viewer's eye.

However, the output power of the light source set to or below Class 2 may reduce brightness of images projected on a projection surface such as a screen, which may impede good image observation.

Therefore, Japanese Patent Laid-Open No. 2005-10616 discloses a scanning image projection apparatus that separates positions of spots of an R-light flux, a G-light flux and B-light flux from each other in consideration of a pupil of a viewer. Moreover, Japanese Patent Laid-Open No. 2005-114985 discloses a scanning image projection apparatus that has thereinside a long optical path length sufficient to secure safety if an viewer looks directly at a light exit part of the apparatus However, it is necessary for the scanning image projection apparatus disclosed in Japanese Patent Laid-Open No. 2005-10616 to enlarge a scanning area of the light fluxes by a scanning device so as to separate the positions of the spots of the respective color light fluxes. This results in enlargement of the scanning device and a requirement to increase the output power of the laser light source because of reduction of light use efficiency (time efficiency).

Moreover, the scanning image projection apparatus disclosed in Japanese Patent Laid-Open No. 2005-114985 does not allow placement of any device in an area where the optical path is formed, which increases the size of the apparatus.

SUMMARY OF THE INVENTION

The present invention provides a scanning image projection apparatus capable of increasing brightness of projected images while securing safety of a viewer if light from a laser light source directly enters an eye of the viewer.

The present invention provides as an aspect thereof a scanning image projection apparatus including a laser light source constituted by a laser light source, a scanning device configured to scan a light flux from the laser light source in a horizontal direction and a vertical direction at mutually different frequencies on a projection surface. The following condition is satisfied:

$$\frac{(B+C)X}{2000} \leq A \leq \frac{7L}{|L-X|}$$

In the above condition, A represents a diameter (mm) of an exit pupil when viewed from a projection surface side, L represents a distance (mm) from the exit pupil to an image formation position of the light flux, X represents a distance (mm) from the exit pupil to an output measurement position of the apparatus, B and C respectively represent a vertically scanning angular subtense (mrad) and a horizontally scanning angular subtense (mrad) of a scan pulse formed by the light flux, the scan pulse having a pulse length equal to or shorter than 18 microseconds and passing through a measurement aperture placed at the output measurement position.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1A:
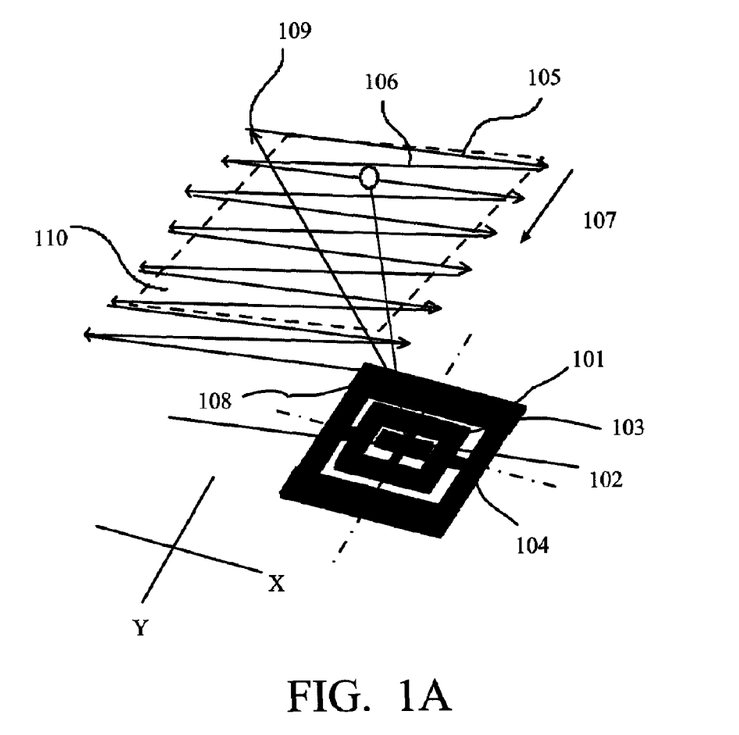
FIGS. 1A and 1B show scanning of a light flux in a scanning image projection apparatus in each embodiment of the present invention.

First, description will be made of a configuration of a main part of a scanning device (also referred to as a "scanner") being used in a scanning image projection apparatus of each embodiment described later with reference to FIG. 1A. FIG. 1A shows a relationship between the configuration of the main part of the scanning device 101 and a scan while securing safety of scan surface (projection surface) 109.

At a central part of the scanning device 101, a movable mirror 102 is formed. The movable mirror 102 is held by a gimbal structure that contains a torsion bar 103 to swing the movable mirror 102 in a horizontal direction shown by an X axis (that is, to swing the movable mirror 102 about a Y axis) and a torsion bar 104 to swing the movable mirror 102 in a vertical direction shown by the Y axis (that is, to swing the movable mirror 102 about the X axis). The movable mirror 102 is swung in the horizontal direction by resonance drive of an actuator (not shown) using an electromagnetic force or an electrostatic force. The horizontal swing of the movable mirror 102 changes a horizontal deflection angle of a mirror surface thereof, and thereby a light flux emitted from a laser light source and reflected by the mirror surface is scanned in the horizontal direction. The movable mirror 102 is swung in the vertical direction by an actuator (not shown) in synchronization with the horizontal swing. The vertical swing of the movable mirror 102 changes a vertical deflection angle of the mirror surface, and thereby the light flux reflected by the mirror surface is scanned in the vertical direction.

A solid line 105 in FIG. 1A shows a scan line that is a trajectory of the light flux scanned by the swing of the movable mirror 102 from a horizontal scan start position to a horizontal scan end position. When the movable mirror 102 is horizontally swung such that the light flux (scan line) is returned to the horizontal scan start position along a solid line 106, the movable mirror 102 is also vertically swung such that the light flux is scanned as shown by an arrow 107 and a laser light source emitting the light flux is modulated in synchronization with the swing of the movable mirror 102. Thereby, a two-dimensional image is displayed by the scan line.

The scan line that has reached a vertical scan end position 108 returns to a first horizontal scan start position 109. In other words, a repetition cycle in the vertical direction decides a frame rate of the displayed image. As described above, the scanning device 101 can scan the light flux in two-dimensional directions, and can perform raster scan of the light flux on the scan surface. The description was made of the case where one scanning device scans the light flux in the two-dimensional directions. However, a scanning device unit constituted by two scanning devices that scan the light flux in different directions may be used.

The international laser safety standard IEC60825 provides requirements relating to safety that should be satisfied by scanning image projection apparatuses scanning a light flux from a laser light source by the above-described scanning device to project images. According to the standard, in repetitive pulsed laser irradiation, measurement of an output power of the scanned laser is performed through a measurement aperture that has a diameter (hereinafter referred to as a "measurement aperture diameter") of 7 mm and is placed at an output measurement position. Moreover, when the repetitive pulsed laser is irradiated to a human body, the apparatus is classified into classes based on a minimum one of laser output values that satisfying the following three criteria.

Criterion 1: An exposure by every single pulse in a pulse train must not exceed an MPE (maximum permissible exposure) for a single pulse.

Criterion 2: An average exposure of a pulse train in an exposure duration T must not exceed the MPE provided for a single pulse in the exposure duration T.

Criterion 3: An average exposure of pulses in a pulse train must not exceed a value obtained by multiplying the MPE for the single pulse by a correction factor C5.

The MPE is calculated using a calculation expression different depending on a pulse time, and the used calculation expression is selected with reference to Table 6 in IEC60825. The exposure duration T shown in Criterion 2 is 0.25 sec that corresponds to an aversive reaction time of a human by a blink in order to be classified into Class 2 or below. Although in a visible wavelength range a value of a constant depending on a time (hereinafter referred to as a "passage time") t during which the light flux passes through the measurement aperture, one of the following fundamental calculation expressions (1) and (2) for calculating the MPE can be used according to Table 6 in IEC60825:

$$\text{MPE} = (\text{constant}) \times C6 (J/m^2) \quad (1)$$

or $$\text{MPE} = (\text{constant}) \times t^{0.75} \times C6 (J/m^2) \quad (2)$$

where C6 represents a correction factor.

To convert the MPE into a permissible value P(Watts) of the laser light source output power that exits the apparatus, calculation of "MPE×(an area of the measurement aperture)/t" may be made. Conversion of the expressions (1) and (2) provides the following expressions (3) and (4) where a "constant" thereof includes the constant in the expressions (1) and (2) and the area of the measurement aperture:

$$P \text{ (Watts)} = (\text{constant}) \times C6/t \quad (3)$$

or $$P \text{ (Watts)} = (\text{constant}) \times C6/t^{0.25} \quad (4)$$

In the scanning image projection apparatus of each embodiment, an image projection region becomes wider as a distance from the apparatus in a projection direction increases. A scan time from one end of the image projection region to another end thereof is fixed (unchanged) irrespective of a distance from an exit pupil of an optical system (described later) of the image projection apparatus, and therefore the passage time t during which the light flux (laser light) passes through the measurement aperture whose diameter is 7 mm becomes shorter as the distance from the apparatus increases. Thus, both the permissible values P calculated by the expressions (3) and (4) become larger as the distance from the apparatus increases.

Each of Criteria 1 to 3 uses the correction factor C6 according to a visual angle in the visible wavelength range (400-700 nm). The correction factor C6 shows how many times the permissible value P can be eased with respect to the criterion, according to a diameter of a spot of the laser light formed on a retina of a viewer, that is, an energy density of the laser light on the retina. Employing such a configuration of the apparatus that the correction factor C6 becomes as large as possible makes it possible to increase the permissible value P used for the classification.

Moreover, the correction factor C6 shows how many times the visual angle α of the laser light entering an eye of the viewer is larger than a minimum angular subtense αmin(=1.5 mrad) provided by the standard. The standard provides that the visual angle α equal to or smaller than 1.5 mrad is treated as 1.5 mrad, and the visual angle α is calculated by using only a range defined by 100 mrad if the visual angle α is equal to or larger than 100 mrad.

As the correction factor C6 used for the calculation of the permissible value P, two visual angles including a visual angle αp in a case where viewer is focusing his/her eyes on the exit pupil that is a scanning point at which the light flux is scanned and a visual angle αf in a case where the scanned light flux enters the eye of the viewer that is viewing an infinite far point.

In each embodiment, A(mm) represents a diameter of the exit pupil (hereinafter referred to as a "exit pupil diameter") when the output power measurement of the apparatus is made at the output measurement position away from the exit pupil by a distance of X in a state where a viewer is viewing the exit pupil from a scan surface side (projection surface side) and is focusing his/her eyes on the exit pupil. Under this definition, the visual angle αp(mrad) is expressed as follows:

$$\alpha p = \frac{A}{X} \times 1000$$

A correction factor C6p is calculated by the following expression (5):

$$C6p = \frac{\alpha p}{\alpha \min} = \frac{1000A}{1.5X} \quad (5)$$

Similarly, when the viewer is viewing the infinite far point, an image of a scan pulse that is limited by the above-described measurement aperture whose diameter is 7 mm is formed on the retina. In each embodiment, a horizontal scan frequency is faster than a vertical scan frequency (that is, the scan frequencies in the vertical and horizontal directions are different from each other), and therefore an image of a linear light flux extending in the horizontal direction is formed on the retina.

Figure 1B:
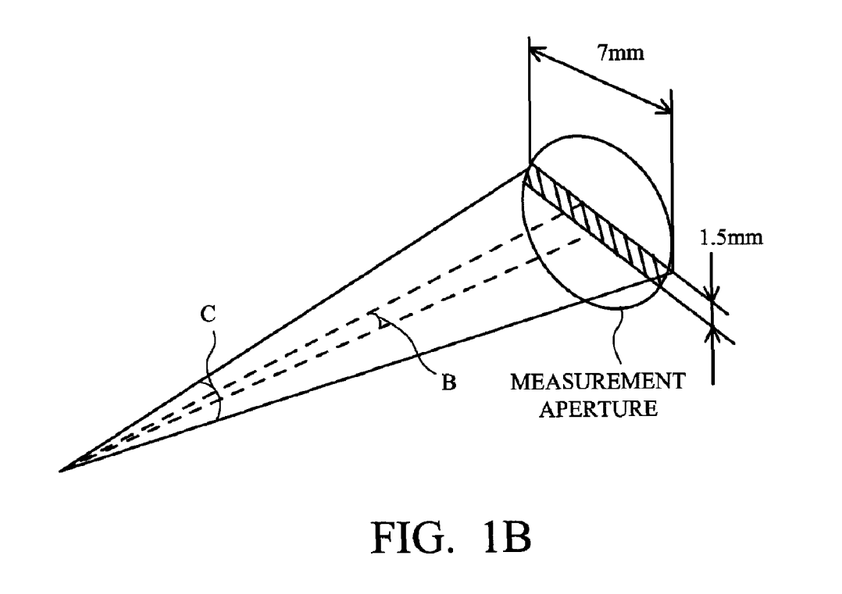

Thus, the visual angle αf(mrad) is defined by using a vertically scanning angular subtense B(mrad) and a horizontally scanning angular subtense C(mrad). As shown in FIG. 1B, B and C are scanning angular subtenses in the vertical and horizontal directions for the scan pulse that passes through the measurement aperture and whose pulse length is equal to or shorter than 18 μsec.

When the laser light source is not a circular laser light source, the visual angle αf(mrad) is calculated as an arithmetic mean value of a longitudinal direction side visual angle and a width direction side visual angle by using the following expression:

$$\alpha f = \frac{B+C}{2}$$

Then, a correction factor C6f is defined as follows:

$$C6f = \frac{\alpha f}{\alpha \min} = \frac{B+C}{3} \quad (6)$$

Description will here be made of the vertically scanning angular subtense B(mrad). A criterion time period for regarding the scan pulse as a single pulse, which is provided in the above-described standard, is 18 μsec. When only one pulse enters the measurement aperture within the criterion time period, the pulse is regarded as a horizontally extended pulse that is not vertically scanned. Moreover, when a pulse interval is short or plural laser light sources are provided, plural pulses are regarded as entering the measurement aperture within the criterion time period. In such states, the vertically scanning angular subtense B(mrad) is used under assumption that the light is vertically scanned as necessary.

Next, description will be made of the horizontally scanning angular subtense C(mrad). The horizontally scanning angular subtense C(mrad) is defined by a line limited by the measurement aperture whose diameter is 7 mm, so that the horizontally scanning angular subtense C(mrad) at the output measurement position is expressed as follows:

$$C = \frac{7}{X} \times 1000$$

However, the above-described standard provides that, when a time period (passage time) T(sec) during which the laser light passes through the measurement aperture is equal to or longer than 18 μsec, pulse lengths up to 18 μsec are eased. Therefore, the horizontally scanning angular subtense C(mrad) is expressed as follows:

$$C = \frac{7}{X} \times 1000 \times \frac{18 \times 10^{-6}}{T}$$

Moreover, the above-described standard provides that energy of the light flux entering the measurement aperture is defined within a region where a light flux having energy corresponding to 50% or more of a peak energy value enters. Therefore, when a diameter of the light flux (hereinafter referred to as a "light flux diameter") at the output measurement position is larger than the measurement aperture diameter (7 mm), not an image of a line limited by the measurement aperture, but an image of a line longer than the measurement aperture diameter is formed on the retina. Thus, the horizontally scanning angular subtense C(mrad) according to the configuration of the apparatus is used.

Figure 2:
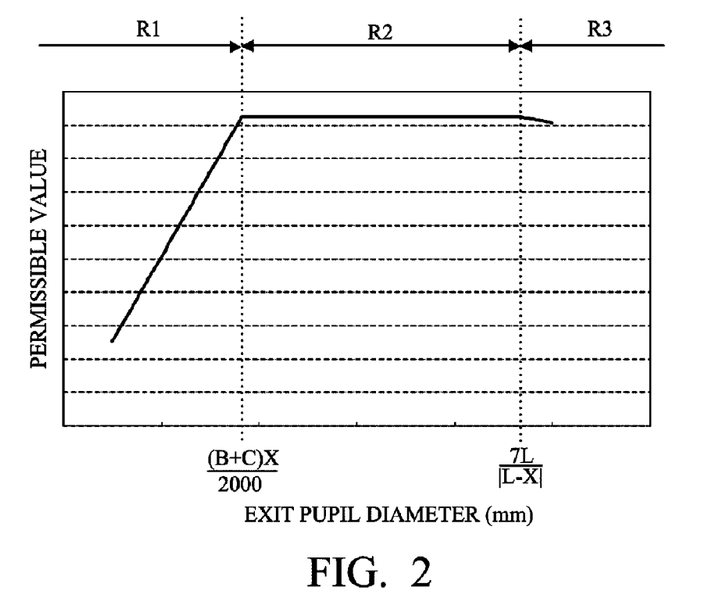
FIG. 2 shows a relationship between an exit pupil diameter and a permissible value in each embodiment.

The permissible value P is calculated from the expression (3) or (4) according to the passage time during which the light flux passes through the measurement aperture, by using a smaller one of values calculated from the expressions (5) and (6). FIG. 2 shows a relationship between the permissible value P and the exit pupil diameter A in a case where a swing angle and a swing frequency of the movable mirror 102 of the scanning device are fixed (constant), that is, a scanning velocity is fixed. In FIG. 2, a horizontal axis shows the exit pupil diameter A, and a vertical axis shows the permissible value P.

As shown in FIG. 2, the relationship between the permissible value P and the exit pupil diameter A has mutually different features in three regions R1, R2 and R3.

In the region R1, the correction factor C6 has a relationship of C6p<C6f, and the permissible value P increases as the exit pupil diameter A increases. In the regions R2 and R3, the correction factor C6 has a relationship of C6p≧C6f.

Moreover, in the region R3, the light flux diameter at the output measurement position is larger than the measurement aperture diameter (7 mm). In this region, although the value of C6f is large, the passage time t is long, which makes the permissible value P small.

Thus, setting the exit pupil diameter A in the region R2 makes it possible to maximize the permissible value P. The region R2 is a region where the relationship of C6p≧C6f makes the light flux diameter Ss at the output measurement position equal to or smaller than 7 mm. The relationship of C6p≧C6f is established when the following condition derived from the above-described expressions (5) and (6) is satisfied:

$$\frac{1000A}{1.5X} \geq \frac{B+C}{3}$$

$$A \geq \frac{(B+C)X}{2000}$$

In addition, when L(mm) represents a distance from a position of the exit pupil to an image formation position of the light flux, the light flux diameter Ss at a position away from the position of the exit pupil by X(mm), that is, at the output measurement position is expressed as follows:

$$Ss = \frac{A|L-X|}{L}$$

In the region R2 the light flux diameter Ss at the position away from the position of the exit pupil by X(mm) is equal to or smaller than 7 mm, and therefore the following relationship is established:

$$\frac{A|L-X|}{L} \leq 7$$

$$A \leq \frac{7L}{|L-X|}$$

Thus, a range of the exit pupil diameter A in the region R2 is shown by the following expression (7):

$$\frac{(B+C)X}{2000} \leq A \leq \frac{7L}{|L-X|} \quad (7)$$

As described above, setting the exit pupil diameter A in the region R2 so as to satisfy a condition shown by the expression (7) makes it possible to obtain a relatively maximum permissible value P for the configuration of the apparatus.

IEC60825 provides that a human can focus his/her eyes on a point away from the eye by 100 mm or more. Therefore, the classification is made by using an output power value measured at a position away from the scanning point in the apparatus by 100 mm or more and at which the output power value becomes maximum. In each embodiment, the measured output power value becomes larger as the output measurement position becomes closer to the exit pupil. Therefore, the distance X to the output measurement position is 100 mm. As a result, the expression (7) can be rewritten into the following expression (8):

$$\frac{B+C}{20} \leq A \leq \frac{7L}{|L-100|} \quad (8)$$

In the expression (8), when L is 100 mm, the denominator of the right side becomes 0. However, an image projection apparatus that forms a spot diameter (light flux diameter) of 7 mm at the position of 100 mm is impractical. Thus, when L is 100 mm, the value of the right side may be treated as infinity.

Although the description was made of the case where the distance to the output measurement position is 100 mm or more according to the current standard, if the standard is revised in the future, the distance to the output measurement position may be changed according to the revision of the standard.

Description will hereinafter be made of specific optical layouts in which the exit pupil diameter is set in the region R2 as Embodiment 1 to 3.

Embodiment 1

Figure 3:
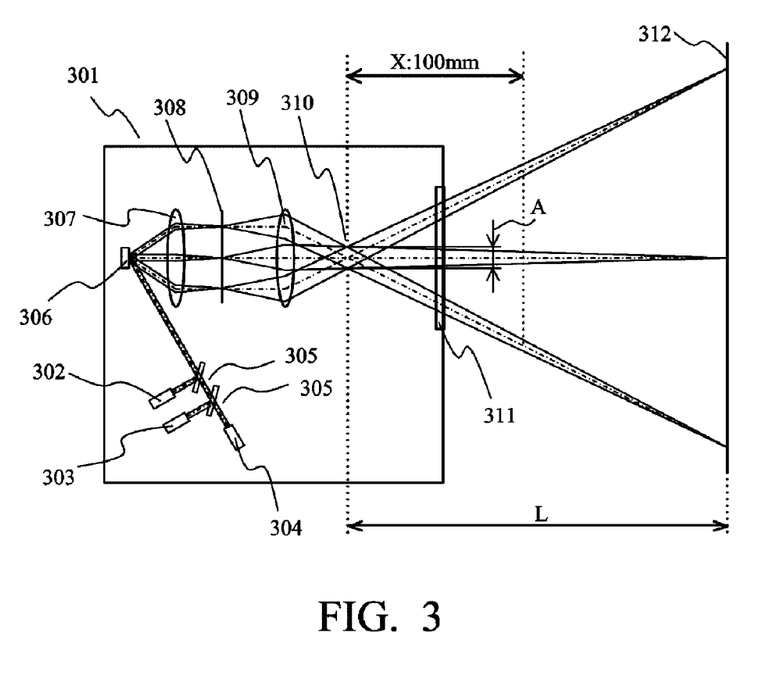
FIG. 3 shows a configuration of a scanning image projection apparatus of Embodiment 1.

FIG. 3 shows a configuration of an optical system of a scanning image projection apparatus 301 that is a first embodiment (Embodiment 1) of the present invention. The apparatus 301 includes a red laser 302, a blue laser 303 and a green laser 304 that are laser light sources. Each color laser is modulated by a drive circuit (not shown) corresponding to an image signal input from an external apparatus such as a personal computer, a DVD player or a television tuner to emit a laser light flux.

The laser light flux emitted from each color laser is converted by a collimator lens (not shown) into a collimated light flux whose diameter is 1.5 mm. The collimated red, blue and green laser light fluxes are combined by two dichroic mirrors 305 to be a combined light flux, and then the combined light flux enters a scanning device 306. The light flux entering the scanning device 306 is two-dimensionally scanned by the above-described movable mirror (102) in the horizontal direction in a swing angle range of 0.7 rad and at a frequency of 18 kHz or more (20 kHz in this embodiment) and in a vertical direction in a swing angle range of 0.52 rad and at a frequency of 60 Hz. A diameter of the movable mirror of the scanning device 306 in this embodiment is 1.5 mm.

This embodiment can scan the laser light flux so as to draw 600 lines in the vertical direction according to the frequencies in the horizontal and vertical directions. A number of pixels in the horizontal direction can be calculated by multiplying the light flux diameter on the movable mirror by the horizontal swing angle range and then dividing the multiplied value by a value obtained by multiplying a truncation coefficient by a use wavelength. The number of pixels in the horizontal direction calculated by using a truncation coefficient of 1.64 and a use wavelength of 640 nm that is a wavelength of the red laser 302 longest among those of the three color lasers 302 to 304 is about 1000. The apparatus of this embodiment can project an image with a resolution of 800×600 pixels (SVGA).

The laser light flux scanned by the scanning device 306 enters a first projection lens 307. The first projection lens 307 causes the entering laser light flux to form an image on a diffusing plate 308. This embodiment places the first projection lens 307 whose focal length is 15 mm at a position away from the scanning device 306 by 15 mm, and places the diffusing plate 308 at a position further away from the first projection lens 307 by 15 mm. Such a configuration causes the laser light flux whose diameter is 1.5 mm and that is scanned by the scanning device 306 to form a spot whose diameter is 9 μm on the diffusing plate 308. The diffusing plate 308 constitutes an optical system having a characteristic of expanding a divergence angle of exiting light flux four times with respect to that of entering light flux. That is, the diffusing plate 308 causes the divergence angle of the light flux exiting from the diffusing plate 308 to be larger than the divergence angle of the light flux entering the diffusing plate 308.

Moreover, this embodiment places a second projection lens 309 whose focal length is 15 mm at a position away from the diffusing plate 308 by 15.7 mm. The second projection lens 309 causes the laser light flux whose divergence angle has been expanded by the diffusing plate 308 to form an exit pupil 310 whose diameter is 6 mm.

The exit pupil 310 is formed by the diffusing plate 308 and the second projection lens 309 as described above. In this configuration, horizontal and vertical scan angles of the laser light flux are kept to angle ranges corresponding to the horizontal swing angle range of 0.7 rad and the vertical swing angle range of 0.52 rad of the scanning device 306. Therefore, the scanning velocity of the laser light flux is not changed. Afterwards, the laser light flux exits the apparatus 301 through an exit window 311, and then forms an image on a screen 312 as a projection surface placed at a position away from the exit pupil 310 by 400 mm to display an SVGA image whose size is about 14 inches.

In the configuration of this embodiment, when a viewer directly views the laser light flux exiting from the exit window 311, a scanning point where the viewer can view the light flux being stopped at one point is, not on the movable mirror of the scanning device 306, but at the exit pupil 310 located at a position having a conjugate relation with the scanning device 306. Therefore, the diameter of 6 mm of the exit pupil 310 that the viewer can view corresponds to the above-described exit pupil diameter A, and the distance of 400 mm from the exit pupil 310 to the screen 312 corresponds to L. Moreover, the output measurement position where the measured output power value of the apparatus 301 of this embodiment becomes maximum is a position away from the exit pupil 310 toward the screen 312 by 100 mm.

Next, description will be made of, not a case where the viewer focuses his/her eyes on the exit pupil 310, but a case where the viewer is a person capable of focusing his/her eyes on the diffusing plate 308 as if the person has hypermetropic eyes. In the case where the viewer focuses his/her eyes on the diffusing plate 308, the light flux forming the spot whose diameter is 9 μm on the diffusing plate 308 forms an image of a spot whose diameter is equal to or smaller then 25 μm on the retina of the viewer. On the diffusing plate 308, the scanned light flux forms an image of a linear spot extending in the horizontal direction.

Therefore, the state where the viewer focuses the eyes on the spot on the diffusing plate 308 is equivalent to the above-described state where the scanned light flux enters the eye of the viewer viewing the infinite far point. Accordingly, the standard regards this state as the above-described state where the scanned light flux enters the eye of the viewer viewing the infinite far point, and therefore provides that, in a case where a light flux forms a spot image whose diameter is equal to smaller than 25 μm on the retina, the visual angle should be set to 1.5 mrad that is the minimum angular subtense.

Moreover, from the relationship between the vertical and horizontal frequencies, an interval between which the scan pulses formed by the light flux that is scanned in the measurement aperture appear is 25 μsec, and thus only one scan pulse appears during 18 μsec. Therefore, since in this embodiment the light flux is not scanned in the vertical direction, this embodiment uses 1.5 mrad as the vertically scanning angular subtense B.

Next, description will be made of the horizontally scanning angular subtense C(mrad). At the output measurement position, the passage time during which the light flux passes through the measurement aperture is 2.4 μsec that is shorter than 18 μsec, this embodiment considers all pulses limited by the measurement aperture whose diameter is 7 mm. Therefore, this embodiment uses 70 mrad as the horizontally scanning angular subtense C.

When substituting the above-described values of B, C and L for the expression (7), the exit pupil diameter A is expressed as follows:

$$3.575 \leq A \leq 9.33$$

Thus, the above-described diameter of 6 mm of the exit pupil 310 in this embodiment satisfies the condition shown by the expression (7).

In the configuration of this embodiment where the exit pupil 310 is not expanded by an optical system, the scanning device 306 corresponds to a scanning point. This configuration requires collimating of the light flux by the collimator lens before the light flux enters the scanning device 306. When the light flux diameter on the scanning device 306 is 1.5 mm and the distance L is fixed to 400 mm, the value of the exit pupil diameter is included in the region R1 that is a region out of the expression (7). This configuration can provide an apparatus output power of only 0.42 times the output power of the laser light source. Therefore, setting of the output power of the laser light source such that the apparatus is classified into Class 2 of the standard makes the projected image dark.

Moreover, although this embodiment sets the exit pupil diameter to 6 mm that is included in the region R2, an exit pupil diameter expanded to 10 mm is included in the region R3. The configuration forming the expanded exit pupil diameter (10 mm) can provide an apparatus output power of only 0.98 times the output power of the laser light source, and therefore setting of the output power of the laser light source such that the apparatus is classified into Class 2 of the standard also makes the projected image dark.

As described above, this embodiment employs the above-described optical layout under the condition that the scanning velocity of the light flux is fixed, thereby enabling increase in brightness of the projected image while securing safety of the viewer if the light flux directly enters the eye of the viewer.

Although this embodiment uses the diffusing plate as the optical system for expanding the divergence angle of the exiting light flux further than that of the entering light flux, other optical systems having a similar function, such as a diffraction grating like a microlens array, may be used. When using the diffraction grating, upon taking into consideration diffracted light components whose light intensity is 10% or more of a diffracted light component whose peak light intensity is highest of plural diffracted light components generated from the diffraction grating, a pupil diameter formed by marginal rays of an outermost diffracted light component is used as the exit pupil diameter.

Embodiment 2

Figure 4:
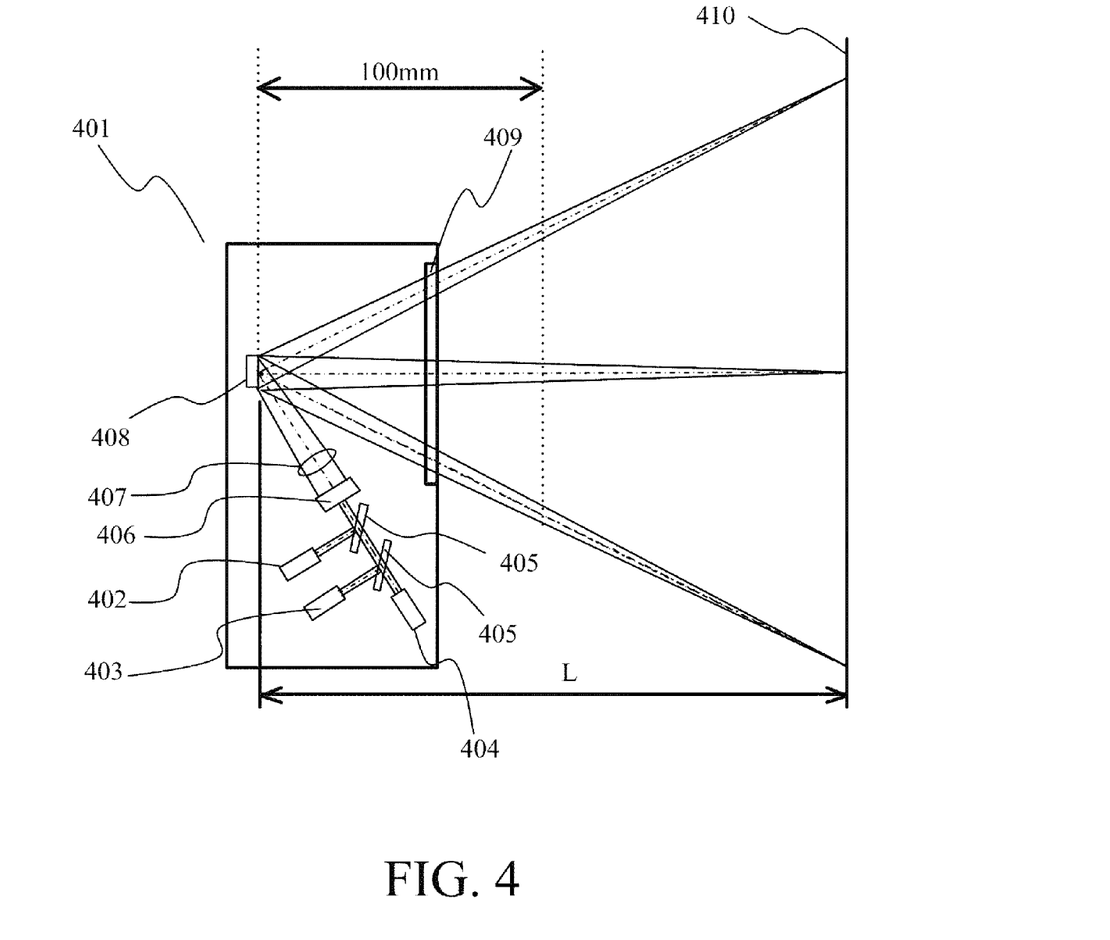
FIG. 4 shows a configuration of a scanning image projection apparatus of Embodiment 2.

FIG. 4 shows a configuration of an optical system of a scanning image projection apparatus 401 that is a second embodiment (Embodiment 2) of the present invention. The apparatus 401 includes a red laser 402, a blue laser 403 and a green laser 404 that are laser light sources. Each color laser is modulated by a drive circuit (not shown) corresponding to an image signal input from an external apparatus to emit a laser light flux. The laser light flux emitted from each color laser is converted by a collimator lens (not shown) into a collimated light flux whose diameter is 1.5 mm. The collimated red, blue and green laser light fluxes are combined by two dichroic mirrors 405 to be a combined light flux, and then the combined light flux is expanded by an expanding optical system 406 to be a collimated light flux whose diameter is 4.4 mm. The expanded collimated light flux is converted into a convergent light flux by a collimator lens 407 whose focal length is 330 mm.

The convergent light flux enters a scanning device 408 placed at a position away from the collimator lens 407 by 30 mm. The light flux entering the scanning device 408 is two-dimensionally scanned by the above-described movable mirror (102) in the horizontal direction in a swing angle range of 0.7 rad and at a frequency of 18 kHz or more (20 kHz in this embodiment) and in a vertical direction in a swing angle range of 0.52 rad and at a frequency of 60 Hz.

The light flux that has passed through the collimator lens 407 has a diameter of 4 mm at the position of the scanning device 408. A diameter of the movable mirror of the scanning device 408 in this embodiment is 4 mm.

This embodiment can scan the laser light flux so as to draw 600 lines in the vertical direction according to the frequencies in the horizontal and vertical directions.

Based on calculation using a truncation coefficient of 1.64 and a use wavelength of 640 nm that is a wavelength of the red laser 402, a number of pixels in the horizontal direction can be set up to about 2700. Accordingly, the apparatus of this embodiment can project an image with a resolution of 800× 600 pixels (SVGA).

The laser light flux scanned by the scanning device 408 passes through an exit window 409, without passing through any optical system such as a diffusing plate and a projection lens, to form an image on a screen 410 placed at a position away from the scanning device 408 by 300 mm which corresponds to the focal length of the collimator lens 407 so as to display an SVGA image whose size is about 11 inches.

In the configuration of this embodiment, when a viewer directly views the laser light flux exiting from the exit window 409, a scanning point where the viewer can view the light flux being stopped at one point is the scanning device 408. Therefore, the light flux diameter of 4 mm on the scanning device 408 corresponds to the exit pupil diameter A, and the distance of 300 mm from the scanning device 408 to the screen 410 corresponds to L. Moreover, the output measurement position where the measured output power value of the apparatus 401 of this embodiment becomes maximum is a position away from the scanning device 408 toward the screen 410 by 100 mm.

Next, description will be made of the vertically scanning angular subtense B(mrad) used in the expression for calculating the visual angle αf, not in a case where the viewer focuses his/her eyes on the exit pupil, but in a case where the viewer views the infinite far point. In the case where the viewer views the infinite far point, in the vertical direction, the light flux forms a spot whose diameter is equal to or smaller than 25 μm on the retina of the viewer. The standard provides that, in the case where the light flux forms a spot whose diameter is equal to smaller than 25 μm, the visual angle should be set to 1.5 mrad that is the minimum angular subtense. Moreover, from the relationship between the vertical and horizontal frequencies, an interval between which the scan pulses formed by the light flux scanned in the measurement aperture appear is 25 μsec, and thus only one scan pulse appears during 18 μsec. Therefore, since in this embodiment the light flux is not scanned in the vertical direction, this embodiment uses 1.5 mrad as the vertically scanning angular subtense B.

Next, description will be made of the horizontally scanning angular subtense C(mrad). At the output measurement position, the passage time during which the light flux passes through the measurement aperture is 2.4 μsec that is shorter than 18 μsec, this embodiment considers all pulses limited by the measurement aperture whose diameter is 7 mm. Therefore, this embodiment uses 70 mrad as the horizontally scanning angular subtense C.

When substituting the above-described values of B, C and L for the expression (7), the exit pupil diameter A is expressed as follows:

$$3.575 \leq A \leq 10.5.$$

Thus, the exit pupil diameter of 4 mm in this embodiment satisfies the condition shown by the expression (7). As described in Embodiment 1, setting the exit pupil diameter in the region out of the expression (7) such that the apparatus is classified into Class 2 of the standard makes the projected image dark.

This embodiment employing the above-described optical layout also can increase brightness of the projected image while securing safety of the viewer if the light flux directly enters the eye of the viewer.

Embodiment 3

Figure 5:
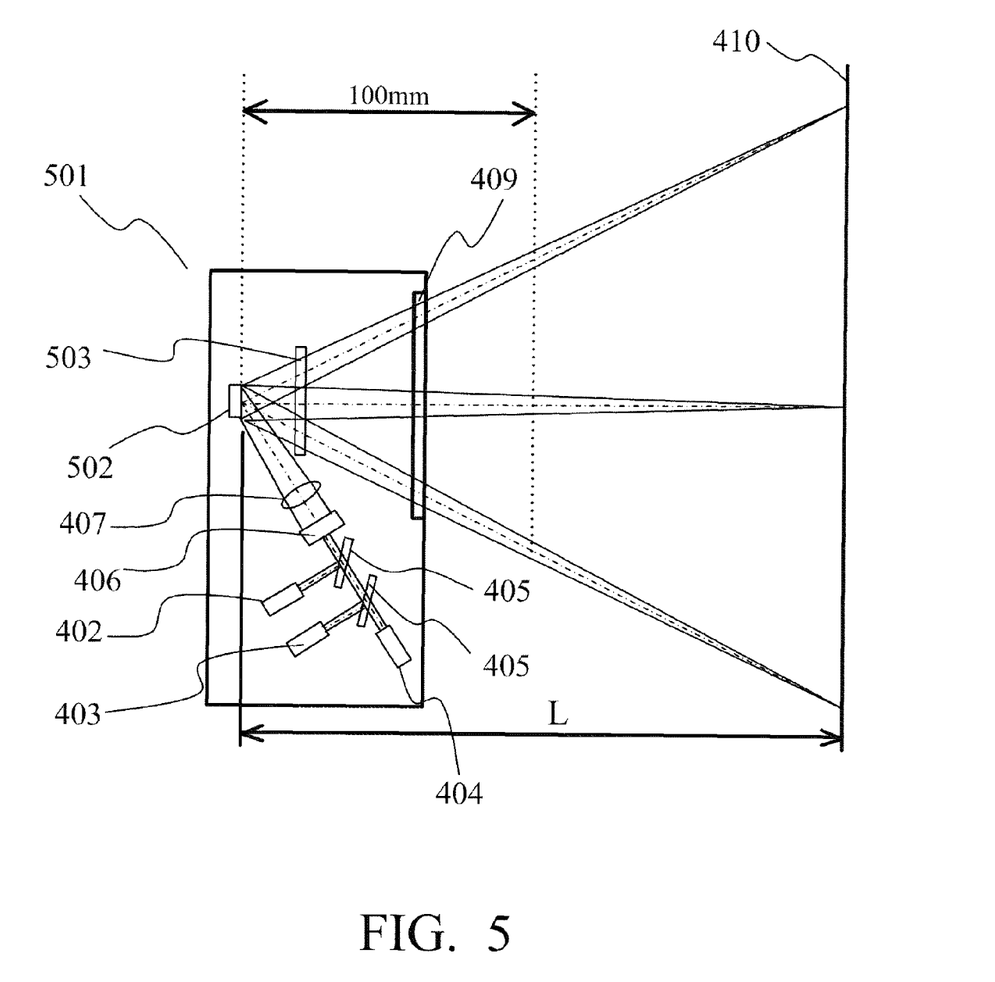
FIG. 5 shows a configuration of a scanning image projection apparatus of Embodiment 3.

FIG. 5 shows a configuration of an optical system of a scanning image projection apparatus 501 that is a third embodiment (Embodiment 3) of the present invention. The apparatus 501 includes a red laser 402, a blue laser 403 and a green laser 404 that are laser light sources. Each color laser is modulated by a drive circuit (not shown) corresponding to an image signal input from an external apparatus to emit a laser light flux. The laser light flux emitted from each color laser is converted by a collimator lens (not shown) into a collimated light flux whose diameter is 1.5 mm, as in Embodiment 2. The collimated red, blue and green laser light fluxes are combined by two dichroic mirrors 405 to be a combined light flux, and then the combined light flux is expanded by an expanding optical system 406 to be a collimated light flux whose diameter is 4.4 mm. The expanded collimated light flux is converted into a convergent light flux by a collimator lens 407 whose focal length is 330 mm.

Figure 6:
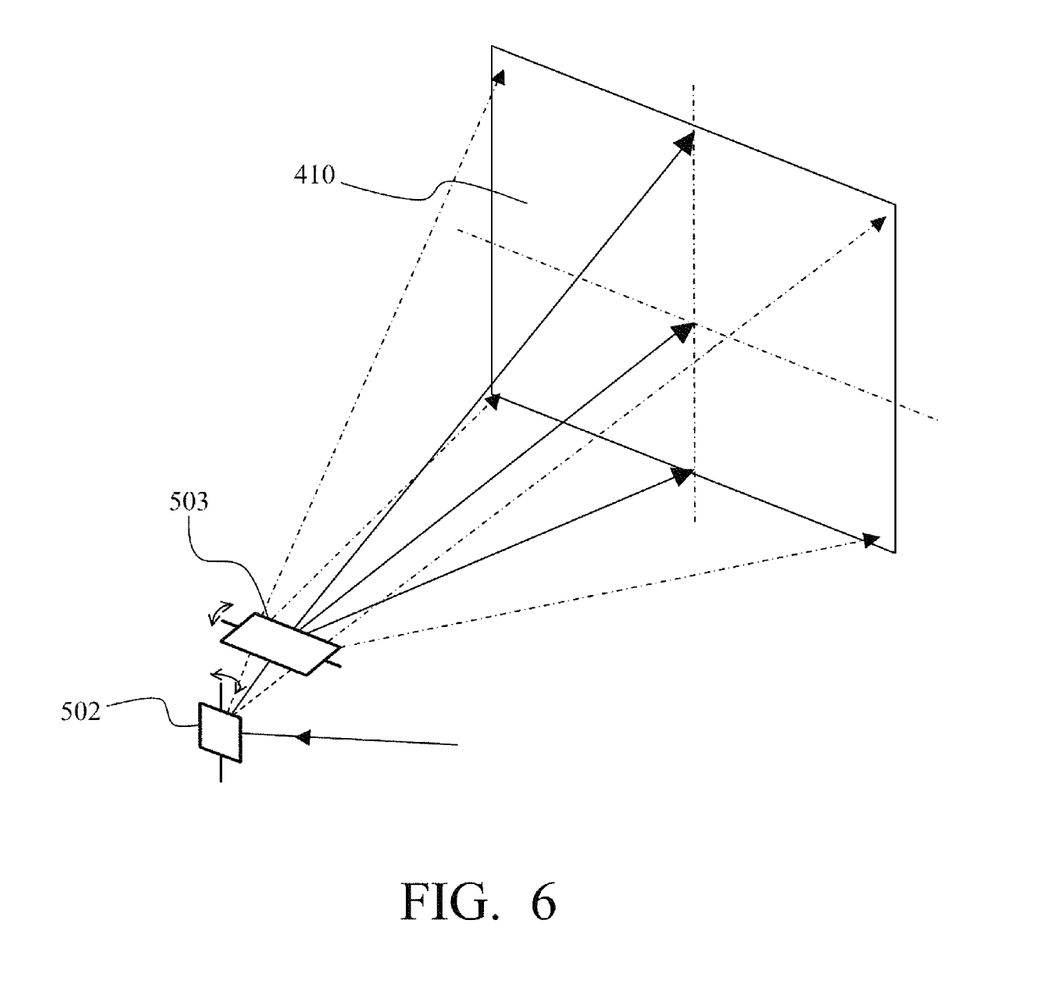
FIG. 6 shows scanning devices used in Embodiment 3.

The convergent light flux enters a scanning device 502 placed at a position away from the collimator lens 407 by 30 mm, as also shown in FIG. 6. The light flux entering the scanning device 502 is scanned by a movable mirror thereof in the horizontal direction in a swing angle range of 0.7 rad and at a frequency of 18 kHz or more (20 kHz in this embodiment). The light flux that has passed through the collimator lens 407 has a diameter of 4 mm at the position of the scanning device 502. A diameter of the movable mirror of the scanning device 502 in this embodiment is 4 mm.

The laser light flux reflected by the scanning device 502 enters a scanning device 503. Since the light flux entering the scanning device 503 is horizontally scanned by the scanning device 502, a movable mirror of the scanning device 503 has a horizontally long shape. The light flux entering the scanning device 503 is scanned by the movable mirror thereof in the vertical direction in a swing angle range of 0.52 rad and at a frequency of 60 Hz. The light flux two-dimensionally (horizontally and vertically) scanned by the scanning devices 502 and 503 is projected to a screen 410 to display a two-dimensional image.

In the configuration of this embodiment, when a viewer directly views the laser light flux exiting from an exit window 409, a scanning point where the viewer can view the light flux being stopped at one point is the scanning device 502. Therefore, the light flux diameter of 4 mm on the scanning device 502 corresponds to the exit pupil diameter A, and the distance of 300 mm from the scanning device 502 to the screen 410 corresponds to L.

Next, description will be made of the vertically scanning angular subtense B(mrad) used in the expression for calculating the visual angle αf, not in a case where the viewer focuses his/her eyes on the exit pupil, but in a case where the viewer views the infinite far point. In the case where the viewer views the infinite far point, in the vertical direction, the light flux forms a spot whose diameter is equal to or smaller than 25 μm on the retina of the viewer. The standard provides that, in the case where the light flux forms a spot whose diameter is equal to smaller than 25 μm, the visual angle should be set to 1.5 mrad that is the minimum angular subtense.

Moreover, from the relationship between the vertical and horizontal frequencies, an interval between which the scan pulses formed by the light flux scanned in the measurement aperture appear is 25 μsec, and thus only one scan pulse appears during 18 μsec. Therefore, since in this embodiment the light flux is not scanned in the vertical direction, this embodiment uses 1.5 mrad as the vertically scanning angular subtense B.

Next, description will be made of the horizontally scanning angular subtense C(mrad). At the output measurement position, the passage time during which the light flux passes through the measurement aperture is 2.4 μsec that is shorter than 18 μsec, this embodiment considers all pulses limited by the measurement aperture whose diameter is 7 mm. Therefore, this embodiment uses 70 mrad as the horizontally scanning angular subtense C.

When substituting the above-described values of B, C and L for the expression (7), the exit pupil diameter A is expressed as follows:

$$3.575 \leq A \leq 10.5$$

Thus, the exit pupil diameter of 4 mm of the exit pupil in this embodiment satisfies the condition shown by the expression (7). As described in Embodiment 1, setting the exit pupil diameter in the region out of the expression (7) such that the apparatus is classified into Class 2 of the standard makes the projected image dark.

This embodiment employing the above-described optical layout also can increase brightness of the projected image while securing safety of the viewer if the light flux directly enters the eye of the viewer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059177, filed Mar. 16, 2010 which is hereby incorporated by reference herein in its entirety.

What is claimed is:

1. A scanning image projection apparatus comprising:

a laser light source;

a scanning device configured to scan a light flux from the laser light source in a horizontal direction and a vertical direction at mutually different frequencies on a projection surface, wherein the following condition is satisfied:

$$\frac{(B+C)X}{2000} \leq A \leq \frac{7L}{|L-X|}$$

where A represents a diameter (mm) of an exit pupil when viewed from a projection surface side, L represents a distance (mm) from the exit pupil to an image formation position of the light flux, X represents a distance (mm) from the exit pupil to an output measurement position of the apparatus, B and C respectively represent a vertically scanning angular subtense (mrad) and a horizontally scanning angular subtense (mrad) of a scan pulse formed by the light flux, the scan pulse having a pulse length equal to or shorter than 18 microseconds and passing through a measurement aperture placed at the output measurement position.

2. A scanning image projection apparatus according to claim 1, further comprising an optical system placed closer to the projection surface than the scanning device and configured to cause a divergence angle of the light flux exiting from the optical system to be larger than a divergence angle of the light flux entering the optical system.

* * * * *